(12) United States Patent
Garrec et al.

(10) Patent No.: US 8,768,542 B2
(45) Date of Patent: Jul. 1, 2014

(54) METHOD AND SYSTEM FOR ASSISTING IN THE LANDING OR THE DECKING OF A LIGHT AIRCRAFT

(75) Inventors: Patrick Garrec, Merignac (FR); Pascal Cornic, Brest (FR)

(73) Assignee: Thales, Neuilly sur Seine (FR)

( * ) Notice: Subject to any disclaimer, the term of this patent is extended or adjusted under 35 U.S.C. 154(b) by 421 days.

(21) Appl. No.: 12/783,972

(22) Filed: May 20, 2010

(65) Prior Publication Data
US 2011/0130898 A1 Jun. 2, 2011

(30) Foreign Application Priority Data

May 20, 2009 (FR) ...................................... 09 02475

(51) Int. Cl.
*G06F 7/70* (2006.01)
(52) U.S. Cl.
USPC ............................................ 701/14; 701/13
(58) Field of Classification Search
USPC ..................................................... 701/13–14
See application file for complete search history.

(56) References Cited

U.S. PATENT DOCUMENTS

| 5,216,611 A | 6/1993 | McElreath |
| 5,570,095 A * | 10/1996 | Drouilhet et al. ........ 342/357.31 |
| 6,405,107 B1 * | 6/2002 | Derman ............................. 701/3 |
| 7,890,248 B2 * | 2/2011 | Poe et al. ....................... 701/120 |
| 2002/0116127 A1 * | 8/2002 | Sadler ............................ 701/301 |
| 2004/0006412 A1 * | 1/2004 | Doose et al. ..................... 701/10 |
| 2004/0225440 A1 * | 11/2004 | Khatwa et al. ................. 701/301 |
| 2005/0190079 A1 * | 9/2005 | He .................................. 340/945 |
| 2007/0106433 A1 * | 5/2007 | He ................................... 701/16 |
| 2009/0055038 A1 | 2/2009 | Gerrec et al. |
| 2009/0143968 A1 * | 6/2009 | Truitt ............................. 701/120 |
| 2012/0059536 A1 * | 3/2012 | Pepicelli et al. ................. 701/11 |

FOREIGN PATENT DOCUMENTS

| WO | 02/091595 A2 | 11/2002 |
| WO | 2007/063126 A1 | 6/2007 |

* cited by examiner

*Primary Examiner* — Hussein A. Elchanti
(74) *Attorney, Agent, or Firm* — Baker & Hostetler LLP

(57) ABSTRACT

The present invention relates to a method and a system for assisting in the landing or the decking of a light aircraft, the method being implemented by a system comprising a device on the ground for locating the aircraft, the aircraft having an onboard signal sender, the method comprising at least the following steps: the locating device on the ground uses signals sent by the sender to determine the position and/or movement of the aircraft; said device transmits the previously determined aircraft position and/or movement data to the aircraft; display means show at least some of said data made accessible to the pilot of the aircraft. The invention applies in particular to the field of civil light aeronautics, notably for facilitating the landing of pleasure aeroplanes, small transport aeroplanes and helicopters.

17 Claims, 3 Drawing Sheets

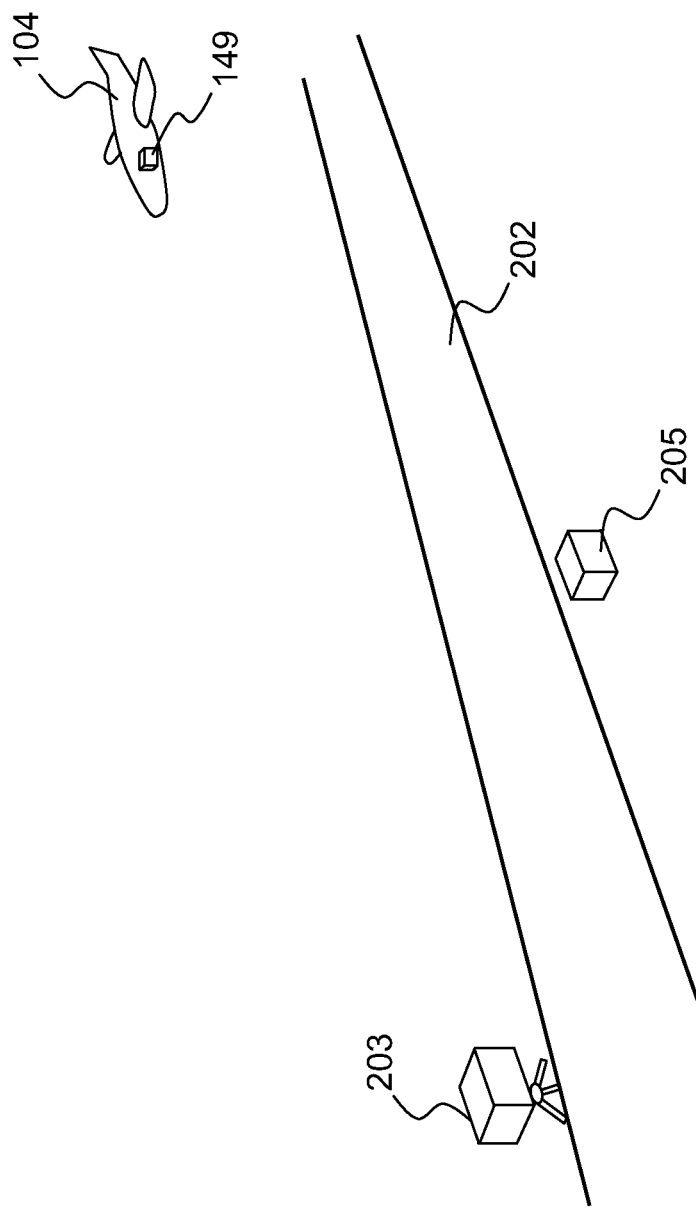

METHOD AND SYSTEM FOR ASSISTING IN THE LANDING OR THE DECKING OF A LIGHT AIRCRAFT

CROSS-REFERENCE TO RELATED APPLICATIONS

This application claims priority to foreign France patent application No. 0902475, filed on May 20, 2009, the disclosure of which is hereby incorporated by reference in its entirety.

FIELD OF THE INVENTION

The present invention relates to a method and a system for assisting in the landing or the decking of a light aircraft. It applies in particular to the field of civil light aeronautics, notably to facilitate the landing of pleasure aeroplanes, small transport aeroplanes and helicopters.

BACKGROUND OF THE INVENTION

Among the aircraft landing assistance systems, the best known are the ILS systems, ILS standing for "Instrument Landing System". ILS systems are instrument approach systems for aircraft equipped therewith. An ILS system supplies information assisting the pilot in his landing manoeuvre. Such systems therefore require specific instrumentation on board the aircraft as well as detection and guidance systems on the ground.

Another guidance system employed at airports is the MLS, MLS standing for "Microwave Landing System". It provides precision guidance for a landing, regardless of the meteorological conditions.

The ILS and MLS systems are very expensive and bulky items of equipment both on the ground and on board the aircraft. Light aircraft cannot include the equipment needed to implement these systems as much for cost reasons as for lack of space.

Apart from these conventional means that are primarily used by commercial civil aviation, other solutions can be envisaged.

A first solution uses a satellite positioning system, this type of system being commonly designated by the acronym GNSS, standing for "Global Navigation Satellite System". Among these positioning systems, the GPS system, GPS standing for "Global Positioning System", is now the most widely used. The main drawback of the GNSS systems is their lack of robustness. In practice, this type of service is not always available and is sensitive to electromagnetic interference.

A second solution is to use a LIDAR system, LIDAR standing for "Light Detection And Ranging". This locating system, which operates on the same principle as radars, uses lasers in the visible range, and even in the infrared range. This therefore makes it ineffective in unfavourable weather conditions.

Another solution consists in using a highly directional millimetre-wave radar. Millimetre-wave radars require a search phase to designate the target. They must also be positioned accurately relative to the runway. This solution is, furthermore, very costly and often requires an onboard responder on the aircraft. The responder is itself costly, bulky and heavy, and it consumes a lot of energy. It also has to be made redundant for operational safety reasons.

Other locating methods for automatically guiding unmanned aircraft have been proposed in the past. Notable among these is the international patent application referenced by the number WO2006/053868, which notably proposes using a radar on the ground and a multifunction beacon on board the aircraft. However, this method does not solve the problem of assisting in the landing of manned aircraft, notably when the environmental conditions are unfavourable, for example when visibility is almost zero in foggy weather.

One technique described in the international patent application WO 02/091595 makes it possible to guide an aircraft in the landing phase using an interrogator-responder exchange between the ground and the aircraft. However, this synchronous system requires significant specific equipment, both on the ground and on the aircraft. Furthermore, this system suffers from a significant blind spot close to the secondary radar on the ground and implementing such a system is complex because of the accuracy required.

SUMMARY OF THE INVENTION

One aim of the invention is to propose an inexpensive method for facilitating the landing of a manned light aircraft. To this end, the subject of the invention is a method for assisting in the landing or the decking of a manned aircraft, the aircraft being of the engine-powered light aircraft type suitable for visual flight, the method being implemented by a system comprising a device on the ground for locating the aircraft, comprising at least one sensor and a reference beacon, the aircraft having an onboard sensor sending signals asynchronously to the device on the ground, the method being characterized in that it comprises at least the following steps:
  the locating device on the ground uses signals sent by the sender to determine the position and/or the movement of the aircraft;
  said device transmits the previously determined aircraft position and/or movement data, for example via a radiofrequency link, to the aircraft;
  display means in the aircraft or radio communication means in the aircraft show the pilot of the aircraft at least some of said data to assist in the landing or the decking.

The expression "locating device" should be understood to mean a device suitable for measuring the position of the aircraft but not only for that. In practice, such a device can also measure other parameters such as the radial speed of the aircraft. As an example, the data transmitted to the aircraft by the device on the ground include the position of the aircraft, its radial speed, the barometric pressure measured on the ground. The pilot always remains in control of the manoeuvres performed because the system according to the invention does not act on the aircraft controls; it provides the pilot with additional information and increases the reliability of the information already available with the onboard instruments.

The expression "light aircraft" should be understood to mean an aircraft whose certified maximum capacity recorded in the airworthiness documents associated with the aircraft is less than 10 seats, apart from the pilot seats, or a rotorcraft whose certified maximum capacity recorded in the airworthiness documents associated with the aircraft is less than 6 seats apart from the pilot seats, or an aeroplane whose certified maximum weight on take-off is less than 6000 kg, or a rotorcraft whose certified maximum weight on take-off is less than 3000 kg.

Advantageously, the onboard sender in the aircraft sends a continuous sinusoidal signal.

The method according to the invention can also comprise a step of correlating data obtained from the device for locating the aircraft from the ground with the data produced by the onboard instruments, the results of this correlation step being utilized on board the aircraft. Such correlated data can then be displayed, and, for example, be used to consolidate the data obtained from the onboard instruments. This correlation step can notably be used to detect an anomaly in the measurements taken by the onboard instruments.

According to one embodiment of the method according to the invention, a data consistency index is determined from the correlation step, and an alarm is raised for the pilot when said index is below a set threshold.

A bidirectional radiofrequency data link can be set up between the locating device on the ground and the aircraft, the measurements obtained from instruments on board the aircraft being transmitted to the locating device on the ground via said data link, said device on the ground utilizing said measurements to refine its determination of the data relating to the position and/or the movement of the aircraft. For example, the "wind" speed estimated from the aircraft may be transmitted to the ground. Analyses can be performed on the ground, so as to generate a reliability index and raise an alert in the event of an anomaly.

According to one embodiment of the method according to the invention, the aircraft inserts, from the data sent to the locating device on the ground, an identifier specific to the aircraft, said device inserting in return said identifier from the data transmitted to the aircraft. The use of this identifier as a signature makes it possible to accept, on the aircraft, only the data that is intended for it without being disturbed by data intended for other aircraft.

Another subject of the invention is a system for assisting in the landing or the decking of a manned aircraft, the aircraft being of the engine-powered light aircraft type suitable for visual flight, the system comprising a device on the ground for locating the aircraft provided with a sensor and a reference beacon, the system comprising at least one onboard sender sending signals asynchronously from the device on the ground, means for transmitting data from the locating device to the aircraft and, in the cockpit of the aircraft, means for displaying said data transmitted to the aircraft.

The system according to the invention may comprise an onboard processing module linked to the data transmission means, to the display means and to onboard measuring instruments, the processing module being suitable for correlating the measurements obtained from said onboard instruments with the measurements obtained from said data transmission means.

According to one embodiment of the system according to the invention, the display means are a screen associated with a standby instrument integrated in the aircraft. The data can be transmitted to the integrated standby instrument via a standard bus, for example of ARINC 429 type.

The system according to the invention can also comprise onboard data sending means in the aircraft, said sending means coupled with the transmission means being used to set up a bidirectional link between the locating device on the ground and the aircraft.

According to one embodiment of the system according to the invention, the onboard data transmission means and the onboard sender are integrated in one and the same multifunction beacon. Similarly, the multifunction beacon can comprise sending means and a processing module when these means are implemented by the system.

According to one embodiment of the system according to the invention, the locating device on the ground comprises at least two passive sensors that are spaced apart, fixed close to the decking surface and able to receive the signals sent by the aircraft. This embodiment makes it possible notably to locate the aircraft by triangulation. Furthermore, the passive nature of the sensors means that signals that might be detrimental to the health of people on the ground are not sent.

Advantageously, the system according to the invention applies to aircraft that do not include any instrument landing system, i.e. any ILS system.

BRIEF DESCRIPTION OF THE DRAWINGS

Other features will become apparent from reading the following detailed description given as a nonlimiting example in light of the appended drawings, in which:

FIG. 2a represents a first exemplary locating device on the ground used by the system according to the invention, FIG. 3 represents an exemplary artificial horizon display device integrated in a system according to the architecture shown in FIG. 1a.

DETAILED DESCRIPTION

In the interests of clarity, identical references in the various figures denote the same elements.

Figure 1A:
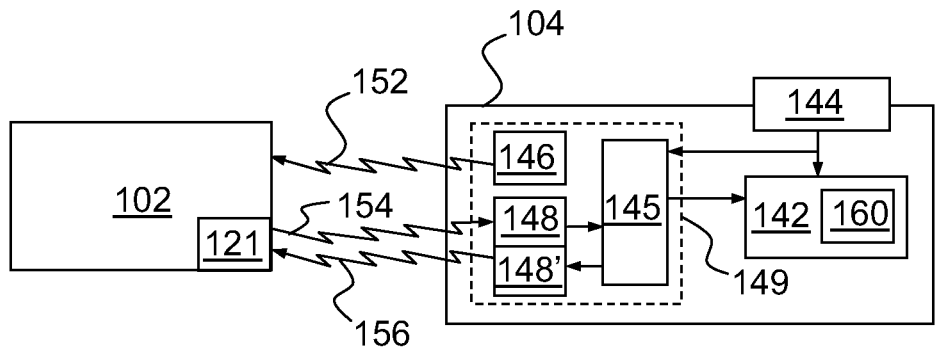
FIG. 1a represents a block diagram showing a first exemplary architecture of the system according to the invention.

FIG. 1a shows, through a block diagram, a first exemplary architecture of the system according to the invention. The system 100 comprises, on the ground, a device 102 for locating the aircraft 104. The aircraft 104 comprises a standby instrument 142, commonly designated ESI, standing for "Electronic Standby Instrument", or IESI, standing for "Integrated Electronic Standby Instrument". This instrument 142 is supplied by onboard or integrated measuring means 144 comprising, for example, sensors, inertial probes and/or accelerometers and can be used, via a screen 160, to display the basic navigation parameters supplied by said measuring means 144, at least the altitude of the aircraft 104, its speed and its attitude.

Unlike a conventional configuration, the IESI 142 is, in the system according to the invention, also supplied by the device 102 for locating the aircraft 104. The locating device 102 utilizes a signal 152 obtained from an onboard sender 146 on the aircraft 104 to determine, notably, the position of this aircraft 104. The locating device 102 then transmits this position—and other parameters, where appropriate—to the aircraft 104, via a radiofrequency link 154 set up between a sender on the ground 121 and onboard reception means 148, for example an antenna receiver, suitable for receiving the parameters. The data obtained from the locating device 102 are then utilized on board the aircraft 104.

For example, these data are displayed and/or correlated with the data already available on board. To correlate the data, the system may include, on board the aircraft 104, a processing module 145, for example a microcontroller, able to receive both data obtained from the instruments on board the aircraft 104 and data obtained from the locating device 102 and transmitted by the reception means 148. The data correlation is used notably to produce reliability indices concerning the measurements. Examples of possible correlations notably include comparing speeds and altitudes measured on the ground with those measured by the onboard instruments. When abnormal discrepancies appear, an alert can be raised for the pilot. The IESI 142 is, in the example, supplied by the processing module 145; however, the IESI 142 can also be supplied directly by the data obtained from the device 102 on the ground and transmitted by the reception means 148.

According to one embodiment of the system according to the invention, data sending means 148', for example an antenna sender, are coupled to the reception means 148 to make it possible to set up a bidirectional radiofrequency link 154, 156 with the locating device 102 on the ground. Thus, data such as the measurements taken by the instruments specific to the aircraft 104 can be transmitted to the ground to be utilized. The locating device 102 on the ground can, by virtue of these onboard data, refine or correct the measurements taken on the ground. The locating device 102 on the ground can, for example, include analysis software capable of comparing the data obtained from the aircraft and the data measured on the ground. In the event of an anomaly—for example, if the descent gradient of the aircraft 104 is too steep—an alert can be raised and sent to the pilot and/or to the controller. According to another embodiment, the sender 146 is used to send data to the ground, according to a principle already described in the international patent application referenced by the number WO 2007/063126.

Advantageously, the aircraft 104 has a multifunction beacon 149 on board comprising the processing module 145, the sender 146, the reception means 148 and, when they exist, the data sending means 148'. Thus, by combining the onboard elements necessary to the operation of the system in one and the same beacon 149, the hardware impact on the aircraft 104 is minimized. For example, when there is a multifunction beacon 149 suitable for operating in send and receive modes behind the blades of a helicopter, said multifunction beacon 149 can be fixed to the windshield of the aircraft 104, which avoids the integration constraints specific to the cockpit of the aircraft 104.

Advantageously, the sender 146 transmits an identifier to the ground that is used to differentiate the data sent by the aircraft 104 from the data possibly sent by other aircraft, this identifier possibly, for example, being specific to the multifunction beacon 149 when such a beacon is on board the aircraft 104. This identifier is then, for example, coded in the data sent by the locating device 102 to the aircraft 104, so that, if several aircraft equipped with the system according to the invention receive said data, only the aircraft 104 for which these data are intended takes them into account.

In the absence of reception means 148 or if said reception means fail, the VOR/DME (VHF Omnidirectional Range/Distance Measuring Equipment) beacon conventionally available on an aircraft 104 can be used to receive the signals sent by the device 102 on the ground.

Figure 1B:
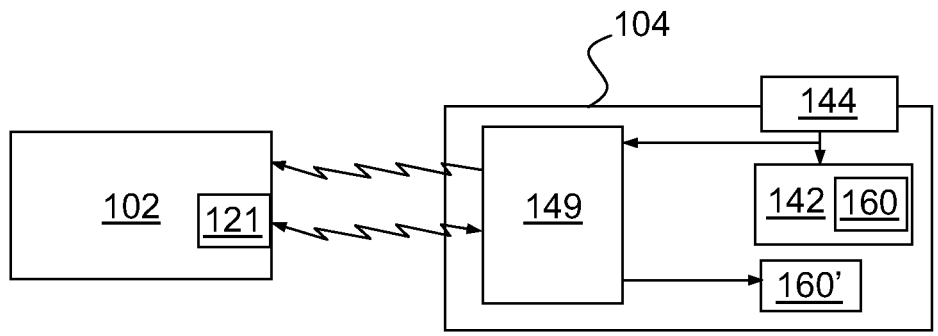
FIG. 1b represents a block diagram showing a second exemplary architecture of the system according to the invention.

FIG. 1b shows, through a block diagram, a second exemplary architecture of the system according to the invention. According to this embodiment, the data obtained from the locating device 102 on the ground are displayed on a dedicated screen 160', independent of the IESI 142. The information delivered to this dedicated screen 160' is supplied to the pilot as a complement to data displayed on the screen 160 of the IESI 142. The multifunction beacon 149 is linked to the dedicated screen 160'. According to an alternative embodiment, the dedicated screen 160' can be integrated in the multifunction beacon 149 when said beacon can be positioned so as to offer the pilot satisfactory visual access.

Furthermore, operation powered by battery and/or by a generator of the aircraft 104 can be envisaged, because of the system's lower energy consumption requirement.

Figure 1C:
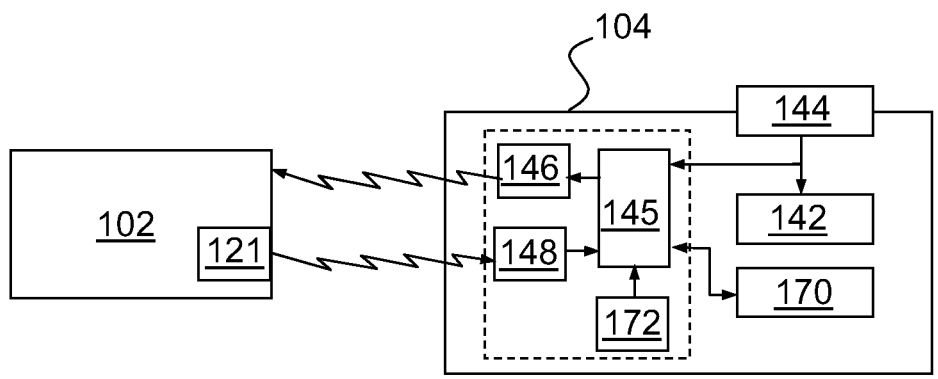
FIG. 1c represents a block diagram showing a third exemplary architecture of the system according to the invention.

FIG. 1c shows, through a block diagram, a third exemplary architecture of the system according to the invention. According to this embodiment, a satellite positioning terminal 170, for example a GPS terminal, is available and the screen of this terminal 170 is used to display the data obtained from the locating device 102 on the ground. In the example, the sender 146 is used both to send signals intended to facilitate the detection of the aircraft 104, but also to send data to the locating device 102 on the ground; in other words, the sender 146 also fulfils the functions of the data sending means 148' of FIG. 1a.

The data obtained from the locating device 102 on the ground can be compared to the data supplied by the satellite positioning terminal 170. The terminal 170 can supply measurements of medium reliability, in particular for the altitude measurements. Also, it may be useful to correlate these measurements with those obtained from the locating device 102 on the ground. Notably, since the data measured on the ground may also be affected by a bias, it may be wise the utilize the trend of the measurements produced by the device 102 on the ground to correct the measurements obtained via the onboard satellite positioning system. According to one embodiment of the system according to the invention, the data supplied by the terminal 170 are also consolidated by virtue of the sensors 172 integrated in the multifunction beacon 149. For example, if this beacon 149 comprises a proximeter, an altitude measurement obtained from a baroaltimeter 144 of the aircraft 104 can be consolidated for the pilot based on the measurement obtained from the device 102 on the ground and the measurement obtained from the proximeter 172 of the beacon 149. A reliability index or likelihood coefficient, dependent on the level of correlation between the measurements, may also be supplied to the pilot. All the indications obtained from the system according to the invention are naturally optional, the display of the indications being, moreover, deactivated when the likelihood coefficient falls below a minimum threshold.

In a degraded mode in which the reception means 148 are non-existent or have become inoperative, the data obtained from the ground may be transmitted to the aircraft 104 via a radio link to inform the pilot through audible commands, which can be pre-recorded or frequency-coded. For example, the commands can be pre-recorded in the form of words such as "up", "down", "left", "right", "OK", so as to guide the pilot when the latter has to put down the aircraft in poor conditions. Repeating the commands every second may guarantee correct operation of the system. Furthermore, a hierarchical structure can advantageously be applied to the transmission of the commands according to their criticality.

To prevent an even more degraded mode, in which the onboard sender 146 does not operate, a reflector can be fixed to the aircraft 104, so as to increase its radar cross section and thus facilitate its location using the radar 203 (FIG. 2a) on the ground. For the reflector, it is possible to choose a three-dimensional coordinate system suited to the radar's sending band, for example to the X band. Adhesive metal strips placed on the fuselage of the aircraft can also be used for these purposes. Once the aircraft 104 has been located, audible commands can be transmitted to the pilot by radio.

Moreover, in this degraded mode, it is not possible to transmit the identifier associated with the sender 146. Consequently, to set up an unambiguous link 154 between the device 102 on the ground and the aircraft 104, the identification will, for example, have to be made via radio messages. A lock-on request can be sent automatically when the aircraft 104 is approaching the device 102 on the ground at a certain distance. The pilot of the aircraft 104 receives commands transmitted by the device 102 on the ground, for example audible commands, and is forced to estimate the quality of his identification by diverting around proposed positions. For example, the announcement of the speed of the craft can usefully be used as a lock-on marker. This speed can be compared to the air speed indicator and modulated to check the match between the received data and the data displayed by the onboard instruments.

FIG. 2a shows a first exemplary locating device on the ground used by the system according to the invention. FIG. 2a shows an aircraft 104 in the landing phase on a landing runway 202. The locating device 102 notably comprises a radar 203 on the ground and a beacon 205 on the ground, situated at the edge of the runway 202. A multifunction beacon 149 on board the aircraft 104 and comprising a sender 146 and reception means 148 is also shown in the figure. Such a locating device 102 is notably described in the international patent application WO 2006/053868. The beacon 205 on the ground serves as a reference and can be used to cyclically check the integrity of the locating device 102 on the ground, for example at a rate of 20 times per second. The state of the locating device 102 on the ground can then be uploaded to the aircraft 104.

Figure 2B:
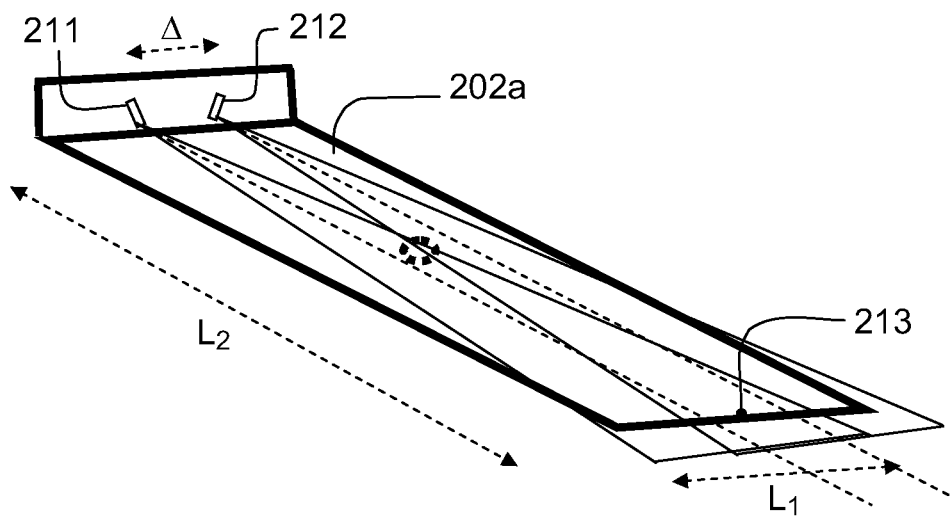
FIG. 2b represents a second exemplary locating device on the ground used by the system according to the invention.

FIG. 2b shows a variant of the locating device on the ground used by the system according to the invention. The locating device of FIG. 2b comprises a number of passive sensors—in the example, two sensors 211, 212—and a sending reference beacon 213. In the example, the sensors 211, 212 are antenna panels comprising several blocks of flat antennas on their surface. The decking surface 202a is, for example, a runway of width L1 equal to 20 m and of length L2 equal to 50 m. These panels 211, 212 are, for example, placed at the end of the decking surface 202a and in a plane roughly orthogonal to this surface 202a, so as to radiate towards said surface 202a. The reference beacon 213 is placed, for example, at the other end of the decking surface 202a. This reference beacon 213 is used to indicate a constant direction to the sensors 211, 212, to standardize and calibrate said sensors 211, 212, and to avoid the thermal drifts by restandardizing the sensors as the sunlight and/or temperature conditions change. The reference beacon 213 sends a signal towards the sensors 211, 212, for example a continuous sinusoidal signal. The signal sent by the reference beacon 213 has a different frequency from that of the signal sent by the sender 146 on board the aircraft 100. According to another embodiment in which the sensors 211, 212 are optical probes, the reference beacon 213 is a diode or a laser used to calibrate said probes 211, 212, such a beacon 213 making it possible to realign the system in relative mode relative to the decking surface 202a and to give a reference (a common "zero") to the sensors 211, 212. The passive sensors 211, 212 are used to locate the aircraft 104 by triangulation. One advantage of this locating device 102 is that it does not require any high power sending from the ground.

When there are side walls close to the decking surface 202a, the sensors 211, 212 are advantageously angled so that the pairs of blocks 702 of antennas are arranged along an axis 709 forming an angle α of between, for example, 20° and 70° with the vertical axis 705. The inclinations of the sensors 211, 212 may be unequal and in the same direction or in opposite directions (for example −45° for one sensor and 45° for the other). By inclining each sensor 211, 212 about a horizontal axis orthogonal to the plane of said sensor, it also becomes possible to perform spatial sampling on the azimuth axis of the amplitude of the interference signal, which consists of the sum of the signal received directly by the sensor 211, 212 and of the signal reflected on the lateral partition or partitions then received by the sensor 211, 212.

Thus, by performing the spatial sampling in two dimensions for each sensor 211, 212, it is possible to identify the point on each sensor 211, 212 that corresponds to the interference signal of maximum amplitude and reapply the formulas demonstrated in the international patent application WO 2007/131923. The amplitudes measured on the antennas are a product of a sine function described in that patent application. The inclined positioning of the sensors, and the spatial sampling in two dimensions of the interference signal means that, by using a minimum of antennas, the multiple paths both in elevation and in azimuth can be disregarded.

Figure 3:
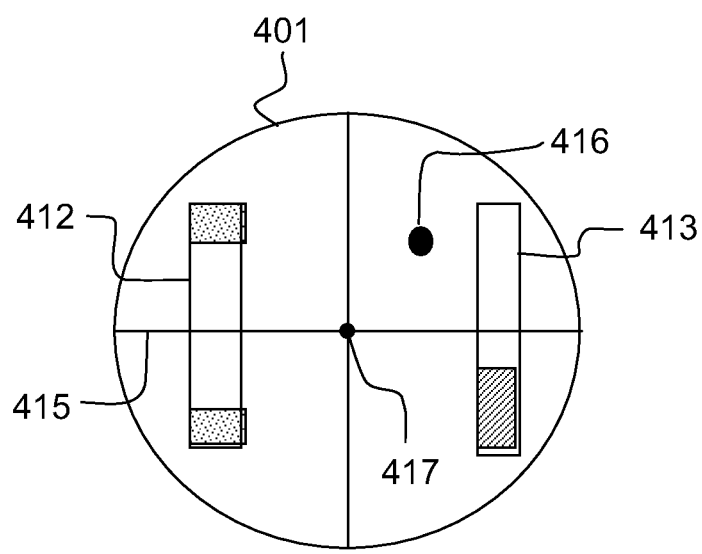

FIG. 3 shows an exemplary artificial horizon display device integrated in a system according to the architecture shown in FIG. 1a. The IESI 142 of the aircraft 104 comprises a screen 401 displaying several navigation parameters obtained from the measuring means 144 (FIG. 1). The IESI 142 comprises a computer for producing, for the screen 401, a graphic image representative of these parameters. In the nonlimiting example of FIG. 3, an indicator 412 on the left of the screen 401 shows the speed of the aircraft, an indicator 413 on the right of the screen 401 shows the altitude, and the horizontal part 415 shows an artificial horizon. The graphic representation of the various indicators and their layout may differ according to the embodiments.

In addition to this information already available on the existing systems, the system according to the invention can display, on this screen 401, the position of the aircraft 104 as determined by the locating device 102 on the ground. For example, this position, in a vertical plane, may be represented by a point 416, the landing or decking point being represented, for example, by a point 417 situated in the centre of the screen 401.

Preferably, the data obtained from the locating device 102 on the ground and transmitted by the reception means 148 to the IESI 142 are formatted according to an aeronautical standard format, for example the "ARINC 429" format. They can also be received via a standard data bus of the IESI 142 and processed easily by the computer of the IESI 142. The additional information available by virtue of the data supplied by the locating device 102 can be displayed on an additional display page or via an overlay on an already existing page.

The system according to the invention can also be linked to the air traffic control systems, commonly designated by the acronym ATC, in order to allow civil aeroplanes to be fully integrated in the airport control system. The aeroplanes can, for example, be recognized from 10 km in the axis of the landing runway. The link between the locating device 102 on the ground and the aircraft 104 can, for example, be set up for a distance of 5 km or less, the position and ground speed data being able to be sent to the aircraft 104 in the form of absolute or relative coordinates.

The system according to the invention can notably be used to facilitate the decking of private helicopters on floating platforms, for example on pleasure ships or in an urban environment, for example on a roof of a building. It applies more particularly to light aviation, that is to say to aircraft that have a flight radius of around a few hundred kilometres, for example private aeroplanes, ULMs, single-engine aeroplanes, light twin-engined aeroplanes.

More generally, the system according to the invention can be used as a redundant system at airports, including those provided with Class III ILS systems. This system could then be offered to the pilot of the aircraft as a "comfort" option, notably to reduce his stress, notably in case of unforeseen poor visibility on landing.

One advantage of the system according to the invention is that it requires very few adaptations to the aircraft and little in the way of installations on the ground, which makes it both quick to implement and inexpensive.

What is claimed is:

1. A method for assisting in the landing or the decking of a manned aircraft, the aircraft being of the engine-powered light aircraft type suitable for visual flight, the method being implemented by a system comprising a device on the ground for locating the aircraft, comprising at least one passive sensor and a reference beacon, the aircraft having an onboard sender sending signals asynchronously to the device on the ground, the method comprising at least the following steps:

providing a locating device on the ground that receives the signals with the at least one passive sensor and uses the signals sent by the sender to determine at least one of a position and a movement of the aircraft;

transmitting from said device on the ground at least one of a previously determined aircraft position and movement data to the aircraft; and displaying, with a display means in the aircraft or a radio communication means in the aircraft, to a pilot of the aircraft at least some of said aircraft position and movement data received from said device on the ground to assist in the landing or the decking.

2. The method for assisting in the landing or the decking of an aircraft according to claim 1, in which an onboard sender in the aircraft sends a continuous sinusoidal signal.

3. The method for assisting in the landing or the decking of an aircraft according to claim 1, further comprising a step of correlating data obtained from the device for locating the aircraft from the ground with the data produced by onboard instruments, the results of this correlation step being utilized on board the aircraft.

4. The method for assisting in the landing or the decking of an aircraft according to claim 3, in which a data consistency index is determined from the correlation step, and in that an alarm is raised for the pilot when said index is below a set threshold.

5. The method for assisting in the landing or the decking of an aircraft according to claim 1, a bidirectional radiofrequency data link being set up between the locating device on the ground and the aircraft, in which measurements obtained from instruments on board the aircraft are transmitted to the locating device on the ground via said data link, said device on the ground utilizing said measurements to refine its determination of the data relating to the position and/or the movement of the aircraft.

6. The method for assisting in the landing or the decking of an aircraft according to claim 5, in which the aircraft inserts, from the data sent to the locating device on the ground, an identifier specific to the aircraft, said device inserting in return said identifier from the data transmitted to the aircraft.

7. The method for assisting in the landing or the decking of an aircraft according to claim 1, wherein the at least one passive sensor comprises an optical sensor.

8. The method for assisting in the landing or the decking of an aircraft according to claim 1, wherein the locating device determines the location of the aircraft by triangulation based on the signals.

9. A system for assisting in the landing or the decking of a manned aircraft, the aircraft being of the engine-powered light aircraft type suitable for visual flight, the system comprising a device on the ground for locating the aircraft provided with a passive sensor and a reference beacon, the device on the ground configured to determine at least one of a position and a movement of the aircraft, the system further comprising at least one onboard sender sending signals asynchronously to the device on the ground, means for transmitting data comprising at least one of the position and the movement of the aircraft from the locating device on the ground to the aircraft, and, in the cockpit of the aircraft, means for displaying at least some of said data comprising at least one of the position and the movement of the aircraft transmitted to the aircraft.

10. The system for assisting in the landing or the decking of an aircraft according to claim 9, the system further comprising an onboard processing module connected to the data transmission means, to the display means and to onboard measuring instruments, the processing module being suitable for correlating the measurements obtained from said onboard instruments with the measurements obtained from said data transmission means.

11. The system for assisting in the landing or the decking of an aircraft according to claim 9, wherein the display means are a screen associated with a standby instrument integrated in the aircraft.

12. The system according to claim 9, comprising onboard data sending means in the aircraft, said sending means coupled with the transmission means being used to set up a bidirectional link between the locating device on the ground and the aircraft.

13. The system according to claim 9, wherein the onboard data transmission means and the onboard sender are integrated in one and the same multifunction beacon.

14. The system according to claim 9, in which the locating device on the ground comprises at least two passive sensors that are spaced apart, fixed close to the decking surface and able to receive the signals sent by the aircraft.

15. The system according to claim 9, in which the aircraft does not include any instrument landing system.

16. The system according to claim 9, wherein the passive sensor comprises an optical sensor.

17. The system according to claim 9, wherein the locating device determines the location of the aircraft by triangulation based on the signals.

* * * * *